United States Patent
Tabuchi

(10) Patent No.: US 6,606,633 B1
(45) Date of Patent: Aug. 12, 2003

(54) COMPOUND DOCUMENT MANAGEMENT SYSTEM AND COMPOUND DOCUMENT STRUCTURE MANAGING METHOD

(75) Inventor: Masahiro Tabuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/400,913

(22) Filed: Sep. 22, 1999

(30) Foreign Application Priority Data

Sep. 22, 1998 (JP) .......................................... 10-286067

(51) Int. Cl.[7] .............................................. G06F 17/00
(52) U.S. Cl. ........................... 707/102; 707/100; 707/8; 707/9; 715/513; 715/514; 715/515
(58) Field of Search ................... 707/100, 102, 707/8, 9, 513, 514, 515; 715/513, 514, 515

(56) References Cited

U.S. PATENT DOCUMENTS

| | | | | |
|---|---|---|---|---|
| 5,181,162 A | * | 1/1993 | Smith et al. | ................. 707/530 |
| 5,787,439 A | * | 7/1998 | Taysom | ...................... 707/103 |
| 5,913,214 A | * | 6/1999 | Madnick et al. | .............. 707/10 |
| 5,946,701 A | | 8/1999 | Hamada | |
| 5,974,418 A | * | 10/1999 | Blinn et al. | .................. 707/100 |
| 6,161,114 A | * | 12/2000 | King et al. | .................. 707/517 |
| 6,205,466 B1 | * | 3/2001 | Karp et al. | .................. 709/104 |

FOREIGN PATENT DOCUMENTS

| | | |
|---|---|---|
| JP | 6-195339 | 7/1994 |
| JP | 8-292952 | 5/1996 |
| JP | 8-292949 | 11/1996 |

* cited by examiner

*Primary Examiner*—Kim Vu
*Assistant Examiner*—Hung Pham
(74) *Attorney, Agent, or Firm*—Foley & Lardner

(57) ABSTRACT

A compound document management system comprises a compound document object holding unit for holding a compound document object and a schema object generating unit for generating a schema object and applying the same to a compound document object, the schema object including a structuring rule table in which structuring rules defining a possible structure of relations of objects are accumulated and a rule searching means for checking a possibility/impossibility of relating of a data object with reference to the structuring rule table, in which the compound document object inquires of the rule searching means whether relating of objects in a desired relation is possible or not and only when the relating is possible, the schema object executes the relating of the objects in question.

20 Claims, 11 Drawing Sheets

COMPOUND DOCUMENT MANAGEMENT SYSTEM AND COMPOUND DOCUMENT STRUCTURE MANAGING METHOD

BACKGROUND OF THE INVENTION

1. Field of the Invention

The present invention relates to a compound document management system which manages a relational structure of each object in a compound document in which data of different formats such as text and image is embedded and a compound document structure managing method, and a recording medium which stores a compound document structure management program.

2. Description of the Related Art

An application program which handles a compound document containing data objects of different formats such as text, image and graph controls, in the compound document in question, a linkage generated by another application program and various data embedded in the compound document. FIG. 11 shows an example of a compound document. In a compound document 1100 shown in FIG. 11, a text 1110, an image 1120 and a graph 1130 are related with each other with their regions (position and size) fixed.

One of conventional systems which handle such a compound document as illustrated in the figure is the system disclosed in Japanese Patent Laying-Open (Kokai) No. Heisei 6-195339. In the system disclosed in the literature, data objects such as an image data object, a text data object and a graph data object are referred to as accommodated objects of a compound document and a compound document object is referred to as an accommodation object. Then, at the time of editing the accommodated object accommodated in the compound document object, when a user gives an instruction to an application program (the application program in question which opens a compound document is referred to as a client program), the client program in question starts an application program for editing an accommodated object (the application program in question which conducts editing is referred to as a server program) to execute editing of the accommodated object designated by the user. Then, the client program receives and manages the editing results obtained by the server program.

In such a conventional system, when the client program receives data of editing results of an accommodated object obtained by the server program, the data can be embedded in a file for storing a compound document in the client program in question. It is also possible to store data of editing results in a file or a storage region prepared separately and store only a reference key for the storage position.

FIG. 12 is a schematic diagram showing one example of a system for managing the accommodated object by an application program which handles a compound document. With reference to FIG. 12, an application program generates a compound document object 1200 corresponding to one compound document and the compound document object 1200 holds a list of accommodated objects. Elements 1210 and 1220 of the list in question hold, in addition to additional information such as a position and a size of an accommodated object, a pointer to an accommodated object.

A word processor as an application program for a compound document, for example, generates the compound document object 1200 for each document created. Then, every time image or graph is applied, the word processor adds the elements 1210 and 1220 to the list of accommodated objects and sets, as list elements, pointers to an image data object 1211 and a graph data object 1221 and attribute information such as a position where the image or the graph in question is embedded into the document and a size of display. Since a word processor is an application program used mainly for the purpose of processing text, the compound document object 1200 also serves as a text object.

Description will be made of a method of relating a data object with a compound document object in accommodated-accommodating relations by using a conventional word processor of this kind. The word processor is capable of relating data created by another application program as a data object with a compound document object by using a shared memory region called a clip-board which is presented by an operating system. Common word processor relates data objects stored in a clip-board by pasting operation. Similarly, as long as the word processor adapts, it is allowed to select a kind of data object to be inserted from a menu which a program presents and relate the data object to a compound document object.

In addition, an application program such as an idea processor, a word processor or a presentation tool having outline display and text display functions is capable of hierarchically displaying a structure of relations between objects which constitute text and image to operate relations in hierarchy. An outline editing function of an idea processor, a word processor or a presentation tool, for example, enables a level setting for each header, as well as enabling a kind and a size of font and the amount of indent of the text set corresponding to each level to be changed by changing, increasing or decreasing a set level.

A data base, another example of an application program for a compound document, defines a schema in advance and stores data adapted to the schema. A data base of this kind enables addition and change of a kind of data to be stored by the addition and the change of a schema definition by a data base designer.

Another conventional device which handles a compound document is the device disclosed in Japanese Patent Laying-Open (Kokai) No. Heisei 8-292949. Disclosed in the literature is a document processing device which, when on a document created by a documentation application program, an object other than a document created by another application program is superposed, preserves relational data such as a superposition position, thereby when the document is changed, referring to the relational data in question to prevent pasting of a document onto the object other than a document.

Although the above-described conventional compound document processing systems present a method of managing accommodated objects and supporting interchange of information between an accommodation object and an accommodated object, there is no common method of relating accommodated objects in a relation other than accommodating-accommodated relations.

Neither exists a common method of adding or changing a manner of determining signification of a relation between accommodated objects after an application program is created.

Under these circumstances, since an application program having the above-described outline display function has an object corresponding to each level of outline predetermined for each application program, it has a shortcoming that a user is not allowed to set rules for selecting a kind of object to be allotted to each level.

Although a word processor, for example, is capable of outline-displaying a header of each chapter in a document, when at an outline-display state, a header of the first level needs to be related to a note where comments are to be written, it is incapable of defining such structuring rules.

The document processing device disclosed in Japanese Patent Laying-Open (Kokai) No. Heisei 8-292949 is also incapable of arbitrarily defining signification of a relation between objects and therefore has to use one prepared in advance.

Although the above-described data base presents a means for limitedly changing a schema definition, the degree of freedom of changing a schema definition is too low to set up a flexible system.

In a customer data base made up of addresses, names, ages and sexes, for example, in a case where a name has uniqueness, if a schema is defined by three relations <name, address>, <name, sex> and <name, age>, user information can be managed in three tables. With such definition, a new attribute (e.g. hobby, favorite) can be added for each user. More specifically, it is only necessary to create a new <name, hobby> table, copy a name in a name field for each user already registered in the data base and copy a specific value indicative of "yet to be input" in a hobby field.

A schema definition changing method of this kind, however, is not allowed to input or edit relevant data unless an application program for operating each field of hobby or favorite is newly created. In other words, it is impossible, in an application program which reflects existing data base design, to newly relate a hobby and a favorite to a user. Also to an address, sex and age, if some information is to be related, the above-described conventional schema definition is useless.

SUMMARY OF THE INVENTION

The present invention is proposed in view of the above-described conventional problems and a first object thereof is to provide a common method of providing structuring rules among objects, thereby providing a compound document management system and a compound document structure managing method enabling creation of a plurality of compound documents having different structures by using the same application program, and a recording medium which stores a compound document structure management program.

A second object of the present invention is to provide a compound document management system and a compound document structure managing method enabling control of consistency of document contents of a compound document and access control on an object basis under distributed surroundings based on a document structure according to structuring rules, and a recording medium which stores a compound document structure management program.

According to the first aspect of the invention, a compound document management system for managing a structure of a compound document in which data of different formats such as text and image is embedded, comprises compound document object holding means for holding a compound document object which accommodates various kinds of data objects, and schema object generating means for generating a schema object which manages a structure of relations between objects accommodated in a compound document object and applying the schema object to the compound document object in question, wherein the schema object, when the compound document object newly relates to other object, only if relating of objects in a desired relation is possible, executes relating of the objects in question.

In the preferred construction, the schema object comprises a structuring rule table in which structuring rules defining a possible structure of relations between objects are accumulated, and rule searching means for checking a possibility/impossibility of relating of a data object with reference to the structuring rule table, and the compound document object, when newly relating to other object, inquires of the rule searching means whether relating of the objects in a desired relation is possible or not.

In another preferred construction, the data object is composed of an entity object made up of actual data and an agent object corresponding to the entity object in question, the entity object is managed independently of the compound document object, and the compound document object conducts relating of the entity object by the management of a structure of a relation of the agent object.

In another preferred construction, the schema object comprises a structuring rule table in which structuring rules defining a possible structure of relations between objects are accumulated, and rule searching means for checking a possibility/impossibility of relating of a data object with reference to the structuring rule table, the compound document object, when newly relating to other object, inquires of the rule searching means whether relating of the objects in a desired relation is possible or not, the data object is composed of an entity object made up of actual data and an agent object corresponding to the entity object in question, the entity object is managed independently of the compound document object, and the compound document object conducts relating of the entity object by the management of a structure of a relation of the agent object.

In another preferred construction, the data object is composed of an entity object made up of actual data and an agent object corresponding to the entity object in question, the entity object is managed independently of the compound document object, the compound document object conducts relating of the entity object by the management of a structure of a relation of the agent object, the agent object has a lock/unlock interface, and the compound document object applies an access control list to the agent object.

In another preferred construction, the compound document management system further comprises rule adding, deleting and changing means for executing addition, deletion and change of a structuring rule with respect to the structuring rule table, wherein the contents of the structuring rule table are changed as required.

In another preferred construction, the data object is composed of an entity object made up of actual data and an agent object corresponding to the entity object in question, the entity object is managed independently of the compound document object, and the compound document object conducts relating of the entity object by the management of a structure of a relation of the agent object, and which further comprises rule adding, deleting and changing means for executing addition, deletion and change of a structuring rule with respect to the structuring rule table, wherein the contents of the structuring rule table are changed as required.

In another preferred construction, the data object is composed of an entity object made up of actual data and an agent object corresponding to the entity object in question, the entity object is managed independently of the compound document object, the compound document object conducts relating of the entity object by the management of a structure of a relation of the agent object, the agent object has a lock/unlock interface, and the compound document object applies an access control list to the agent object, and which further comprises rule adding, deleting and changing means for executing addition, deletion and change of a structuring rule with respect to the structuring rule table, wherein the contents of the structuring rule table are changed as required.

According to the second aspect of the invention, a compound document structure managing method of managing a structure of a compound document in which data of different formats such as text and image is embedded, comprising the steps of:

generating a schema object including a structuring rule table in which structuring rules defining a possible structure of relations between objects are accumulated and rule searching means for checking a possibility/impossibility of relating of a data object with reference to the structuring rule table, and applying the schema object to a compound document object accommodating various kinds of data objects held in compound document object holding means, and when newly relating a data object to the compound document object, inquiring of the rule searching means whether relating of objects in a desired relation is possible or not and only when the relating is possible, executing relating of the object in question.

In the preferred construction, at the step of newly relating a data object to the compound document object, the data object is composed of an entity object made up of actual data and an agent object corresponding to the entity object in question, the entity object is managed independently of the compound document object, and the compound document object conducts relating of the entity object by the management of a structure of a relation of the agent object.

In another preferred construction, the schema object generated at the schema object generating step further comprises rule adding, deleting and changing means for executing addition, deletion and change of a structuring rule with respect to the structuring rule table, and which further comprises the step of changing the contents of the structuring rule table by using the rule adding, deleting and changing means as required.

In another preferred construction, at the step of newly relating a data object to the compound document object, the data object is composed of an entity object made up of actual data and an agent object corresponding to the entity object in question, the entity object is managed independently of the compound document object, and the compound document object conducts relating of the entity object by the management of a structure of a relation of the agent object, and the schema object generated at the schema object generating step further comprises rule adding, deleting and changing means for executing addition, deletion and change of a structuring rule with respect to the structuring rule table, and which further comprises the step of changing the contents of the structuring rule table by using the rule adding, deleting and changing means as required.

According to the third aspect of the invention, a computer readable memory storing a compound document structure management program for controlling a compound document management system which manages a structure of a compound document in which data of different formats such as text and image is embedded, the compound document structure management program comprising the steps of:

generating a schema object including a structuring rule table in which structuring rules defining a possible structure of relations between objects are accumulated and rule searching means for checking a possibility/impossibility of relating of a data object with reference to the structuring rule table, and applying the schema object to a compound document object accommodating various kinds of data objects held in compound document object holding means, and when newly relating a data object to the compound document object, inquiring of the rule searching means whether relating of objects in a desired relation is possible or not and only when the relating is possible, executing relating of the object in question.

According to another aspect of the invention, a compound document management system for managing a structure of a compound document in which data of different formats such as text and image is embedded, comprises a compound document object holding unit for holding a compound document object which accommodates various kinds of data objects, and a schema object generating unit for generating a schema object which manages a structure of relations between objects accommodated in a compound document object and applying the schema object to the compound document object in question, wherein the schema object comprises a structuring rule table in which structuring rules defining a possible structure of relations between objects are accumulated, and a rule searching unit for checking a possibility/impossibility of relating of a data object with reference to the structuring rule table, and the compound document object, when newly relating to other object, inquires of the rule searching unit whether relating of the objects in a desired relation is possible or not and only when the relating is possible, the schema object executes relating of the object in question.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, wellknown structures are not shown in detail in order to unnecessary obscure the present invention.

The present invention provides a generalized method of providing a compound document with structuring rules and applying consistency control and access control of document data based on the structuring rules.

Figure 1:
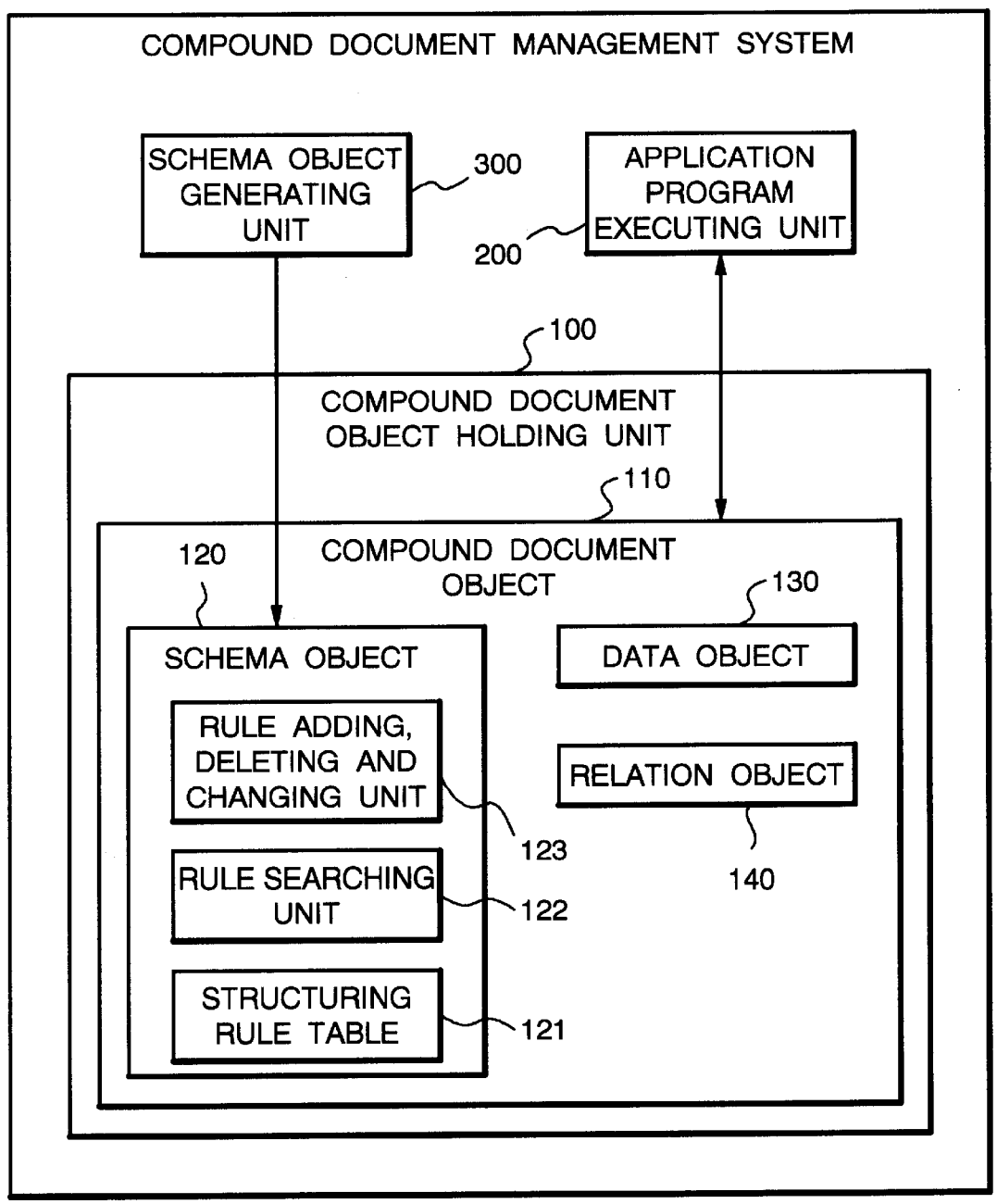
FIG. 1 is a block diagram showing a structure of a compound document management system according to one embodiment of the present invention.

FIG. 1 is a block diagram showing a structure of a compound document management system according to one embodiment of the present invention. With reference to FIG. 1, the compound document management system of the present embodiment includes a compound document object holding unit 100 for holding a compound document object 110, an application program executing unit 200 for executing an application program, and a schema object generating unit 300 for generating a schema object 120.

The compound document object 110 held in the compound document object holding unit 100, as illustrated in the figure, holds data objects 130 of various formats such as text and image, an relation object 140 indicative of signification of a relation between the compound document object 110 and each data object 130 and a relation between the respective data objects 130, and a schema object 120 for managing a structure of a relation between each data object 130 and the relation object 140.

Figure 6:
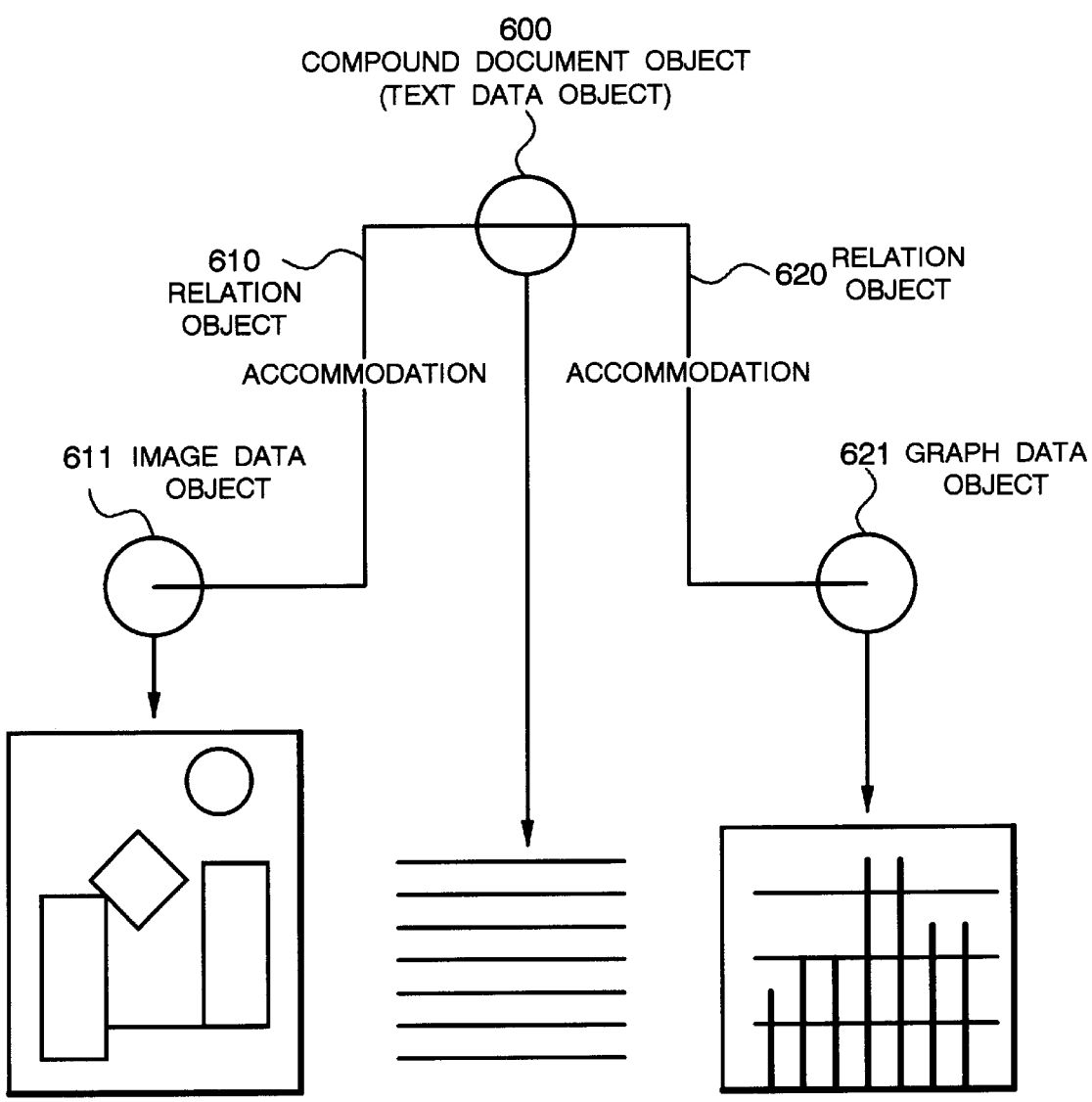
FIG. 6 is a schematic diagram showing a structure of a compound document object with respect to a compound document shown in FIG. 11.
Figure 11:
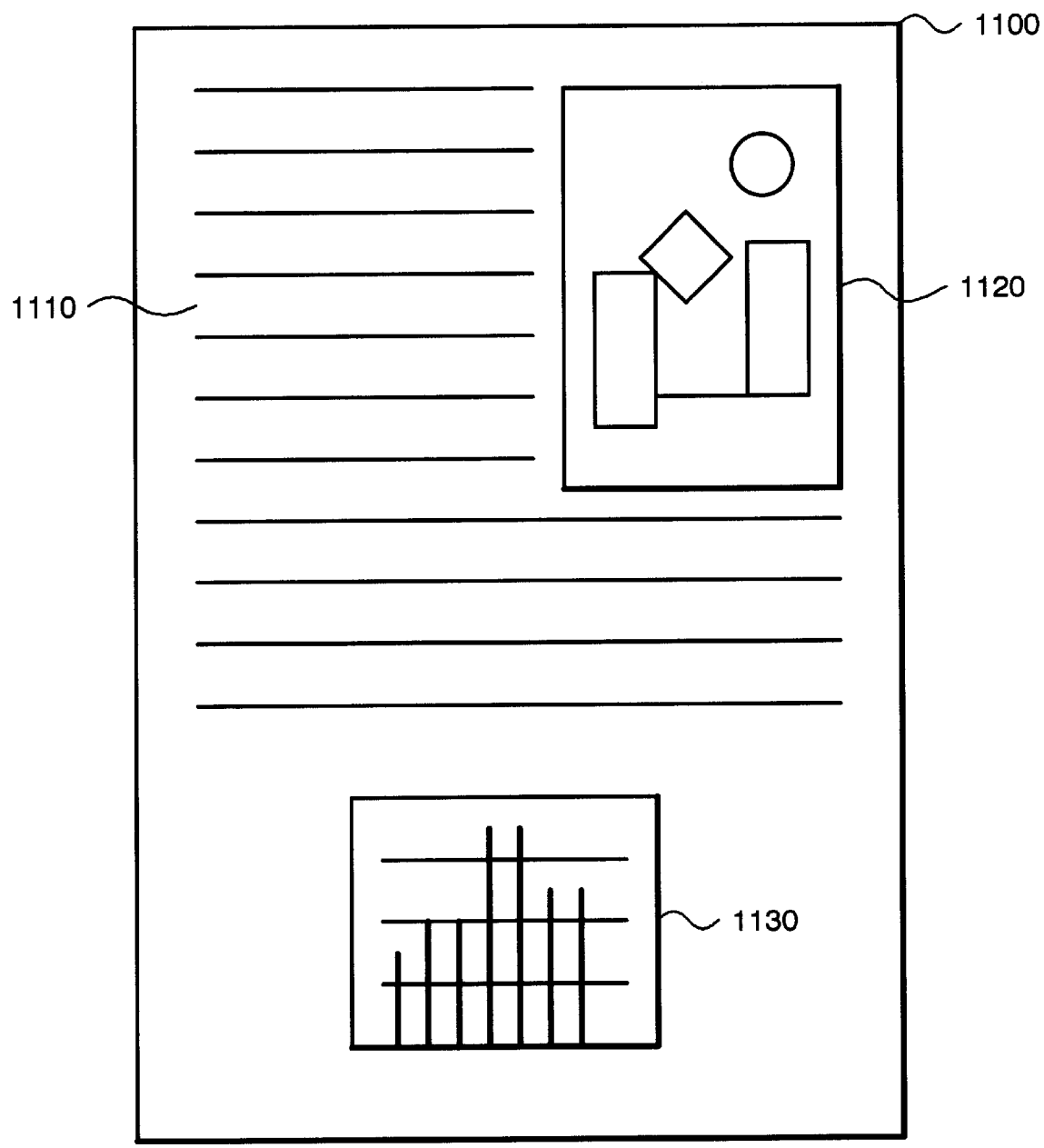
FIG. 11 is a diagram showing an example of a structure of a compound document.
Figure 12:
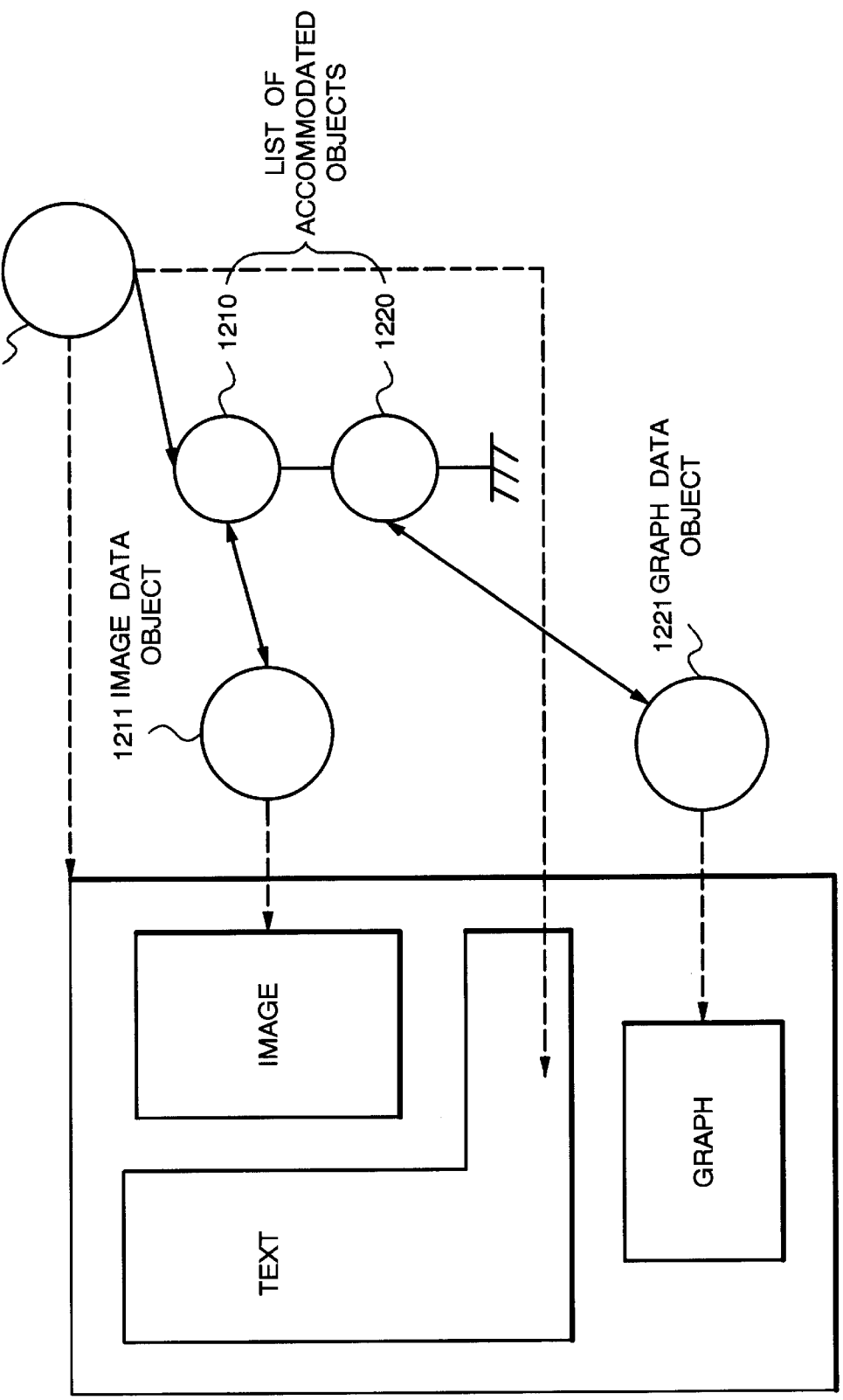
FIG. 12 is a schematic diagram showing a structure of a conventional compound document object with respect to the compound document illustrated in FIG. 11.

FIG. 6 shows an example of a structure of relations of a compound document object corresponding to the compound document illustrated in FIG. 11. With reference to FIG. 6, to the compound document object, various kinds of data objects are related by relation objects.

The compound document management system shown in FIG. 1 is implemented by a personal computer, a work station or other computer system, and its components, the compound document object holding unit 100, the application program executing unit 200 and the schema object generating unit 300 are implemented by a program-controlled CPU, a RAM or other internal memory, and a magnetic disk device or other external storage device, respectively. A computer program which controls the CPU is presented stored in a magnetic disk, an optical disk, a semiconductor memory or other common storage medium and loaded into a storage device of the compound document management system to control the CPU, thereby realizing functions of the respective components. In FIG. 1, illustration is made only of a characteristic part of the structure of the present embodiment and that of the remaining common part is omitted. It is clearly understood that in practice the system further includes an input means for receiving input of various commands and data and an output means for displaying a compound document object opened.

The schema object 120 is a permanent data handle which maintains and manages structuring rules regarding kinds of data objects for each compound document. As illustrated in FIG. 1, the schema object 120 includes a structuring rule table 121 which accumulates structuring rules, a rule searching unit 122 for checking a possibility/impossibility of relating of a data object with reference to the structuring rule table 121, and a rule adding, deleting and changing unit 123 for executing addition, deletion and change of structuring rules in the structuring rule table 121. The schema object 120, when the compound document object 110 is newly generated, is generated by the schema object generating unit 300 and transferred to the new compound document object 110 in question and then held in the compound document object 110.

The structuring rule table 121 accumulates structuring rules indicative of a structure of relations between the compound document object 110 or the data object 130 and the relation object 140 allowed in the compound document object 110. In other words, only the relation of the data objects 130 in a format corresponding to the structuring rules registered in the structuring rule table 121 is authorized in the compound document object 110 in question.

Figure 2:
FIG. 2 is a diagram showing a structure of a structuring rule table in the present embodiment.

The structuring rules registered in the structuring rule table 121, as shown in FIG. 2, are expressed by a combination of a kind of an object as a target of relating (compound document object or data object), a kind of an object to be related (compound document object or data object) and a relation object which relates objects in question. In the first row of the structuring rule table 121 in FIG. 2, for example, "document" in the column Source (Src), "image" in the column Destination (Dst) and "accommodation, . . . " in the column Relation Object List (List of Context) indicate a structuring rule that to a compound document object represented as "document", an image data object represented as "image" can be related by a relation object represented as "accommodation". Indication of "accommodation, . . . " in the relation object list column shows that other relation object in addition to "accommodation" is set as a kind of relating of an image data object to a compound document object.

In addition, setting "document" in the Destination enables a structuring rule to be defined to relate, to a document object or a predetermined data object, other document object. In this case, calling the related compound document from the compound document to which relation is formed is possible(link).

The rule searching means 122 sees, when a data object is to be newly accommodated in a compound document object (to be related by "accommodation" relation object) or when to a predetermined data object, other data object is to be related in some form or other, if the data object in question to be related can be related in a desired sense. Specifically, for example, in a case where the schema object 120 holds the structuring rule table 121 of FIG. 2, when a graph data object is to be accommodated in the compound document object 110, the rule searching means 122 searches the structuring rule table 121 for the registration of a structuring rule which has "document" in the column Source, "graph" in the column Destination and "accommodation" in the column Relation Object List. In this case, since the structuring rule in question exists in the structuring rule table 121, desired relating is possible. When no structuring rule corresponding to the desired relating exists in the structuring rule table 121, the compound document object 110 in question is not allowed to relate to the data object in question.

The rule adding, deleting and changing means 123 adds a new structuring rule to the structuring rule table 121, and deletes and changes structuring rules registered in the structuring rule table 121. Change of structuring rules can be executed by combining deletion and addition of structuring rules.

The data object 130 is a data object of various formats which can be handled in a compound document object such as text, image and graph, and is related by the relation object 140 to the compound document object 110 in some form or other. In this case, there are a case where the data object 130 is directly related to the compound document object 110 and a case where the data object 130 is related to other data object 130 which is related to the compound document object 110.

The relation object 140 forms a relation between the compound document object 110 and the data object 130 or between the data objects 130. The relation object 140 has a definition of signification of relating and pointers to an object as a target of relating (source object) and to an object to be related (destination object). Definition of signification of relating represents a specific manner of realizing the relating in question, for example, how a destination object is displayed with respect to a source object. For the "accommodation" relation object, for example, represented is a manner of displaying a destination object with a predetermined size at a predetermined position within the source object. For the "comment" relation object, represented is a manner of displaying a destination object at a predetermined position when a cursor of a pointing device is located at a display region of the source object.

The application program executing unit 200 executes, as required, various application programs such as a client program which opens and newly generates the compound document object 110 and a server program which executes editing of each data.

The schema object generating unit 300, when the compound document object 110 is newly generated, generates and initializes the schema object 120 and transfers the object to the compound document object 110 in question. Initialization of the schema object 120 is conducted by writing into the structuring rule table 121 a list of structuring rules composed of names of kinds of two data objects applied as a schema file, and a relation object. Kinds of schema file and data object and location of a server program for generating and editing a data object are assumed, for example, to be stored in a global information data base which can be referred to by an application program (client program).

Next, with reference to the flow charts of FIGS. 3 to 5, operation of the present embodiment will be described with respect to some divisional processes.

Figure 3:
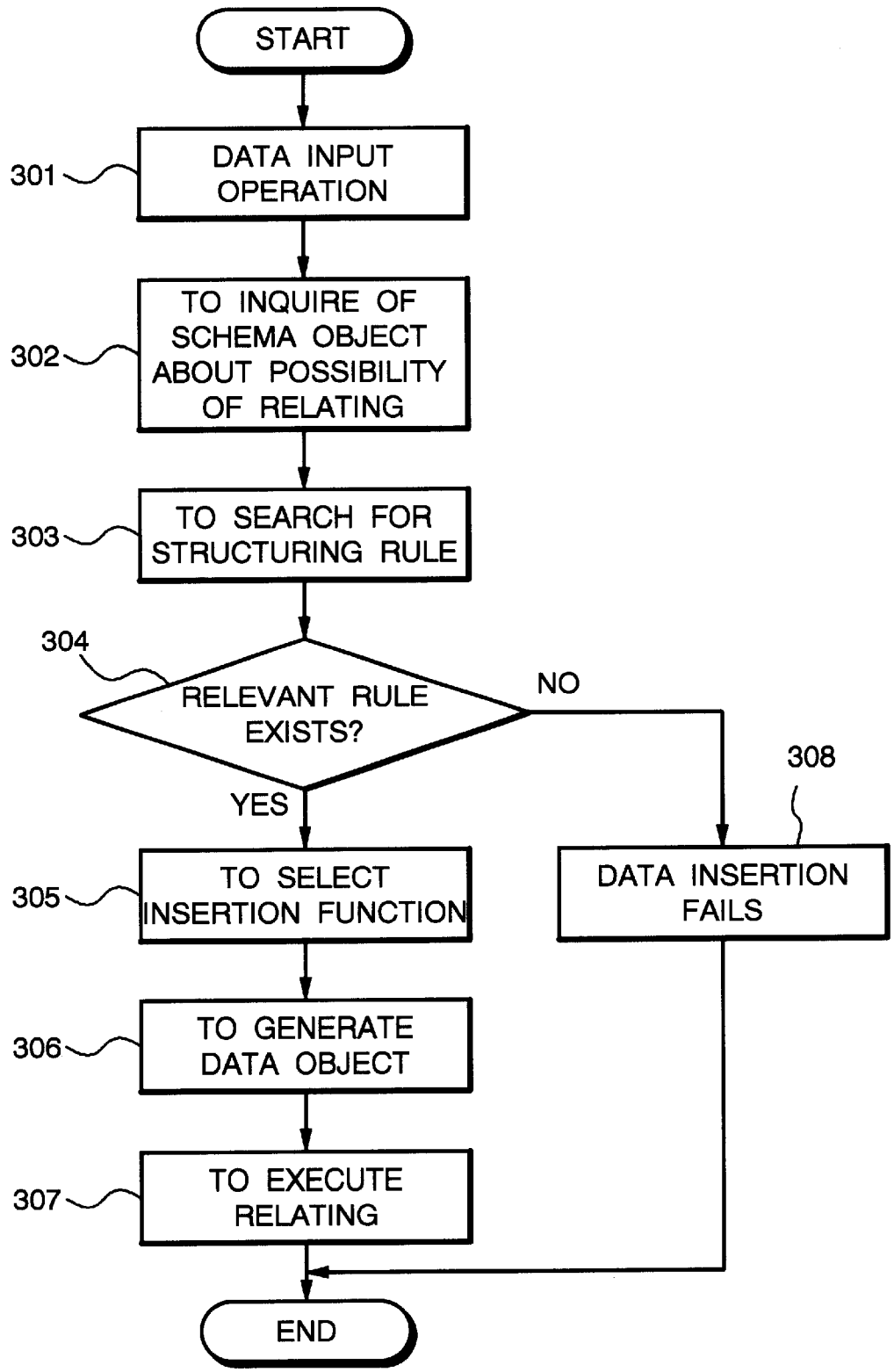
FIG. 3 is a flow chart showing operation of adding data to a compound document in the present embodiment.

FIG. 3 is a flow chart showing a process of user's adding data to a compound document through an application program. Description will be here made of a case of adding image data to a newly created compound document object 110. Since the compound document object 110 is an object which is newly created, no other data object is assumed to be related to the same before the addition of the image data in question. It is clearly understood that it is possible to add a new data object in the same manner also to a compound document object in which some data is already written.

With reference to FIG. 3, first, the user conducts operation for inputting image data through an application program (Step 301). When the application program is a word processor, for example, the user selects the image insertion function through a user interface such as a menu or a tool bar.

Upon the operation of giving an instruction to the user interface for selecting the image insertion function, the application program inquires of the schema object 120 whether the image data object can be related to the compound document object 110 (Step 302).

The schema object 120 obtains information "document" indicative of a kind of the compound document object 110 and information "image" indicative of a kind of the image data object from the global information data base. Then, the rule searching means 122 searches the structuring rule table 12 in the schema object 120 for the existence of a relevant structuring rule, with "document" as a source object, "image" as a destination object and a relation name (name of a relation object, "accommodation" in this case) as keys (Step 303). When the relevant structuring rule exists as a result of the search, the user is allowed to select the image insertion function (Steps 304 and 305) and when the rule fails to exist, the user is not allowed to make a selection (Steps 304 and 308).

When a structuring rule which relates the compound document object 110 and the image data object exists and the image insertion function is selected, the application program, for example, displays a dialog of a list of images and the user selects a desired image from the list to generate an image data object of the image in question (Step 306). The generated image data object 130 is related to the compound document object 110 by an appropriate relation object 140 according to the structuring rule (Step 307).

The image data object 130 related to the compound document object 110 displays an image according to the signification of relating which the corresponding relation object 140 has.

In the foregoing example of operation, description has been made of the operation of relating (accommodating) the data object 130 to (in) the compound document object 110. In a case of relating (accommodation, comment, etc.) to a predetermined data object 130, other data object 130, after a data object 130 as a target of relating is designated, relating between the data objects 130 is conducted in the same manner as mentioned above.

When a plurality of relation objects exist in a structuring rule for a pair of two data objects to be related to each other, there are possible means for a schema object to select a structuring rule, a method of displaying a dialog through an application program to allow a user to make a selection every time a new data object is added and a method of selecting a structuring rule set in the default unless otherwise instructed.

Figure 4:
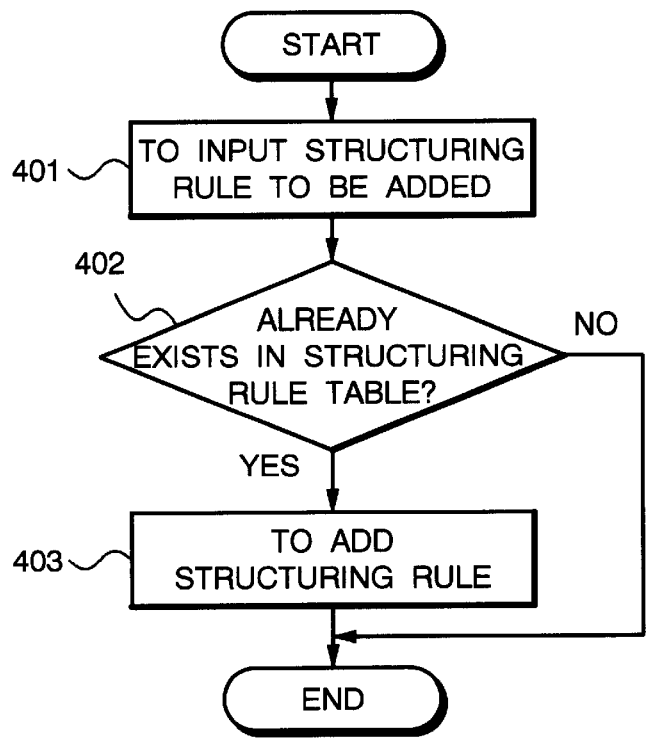
FIG. 4 is a flow chart showing operation of adding a structuring rule to the structuring rule table in the present embodiment.

FIG. 4 is a flow chart showing a process of adding, in the schema object 120, a new structuring rule to the structuring rule table 121. FIG. 5 is a flow chart showing a process of deleting a structuring rule from the structuring rule table 121. As described above, the present embodiment enables flexible setting of a mode of relating a data object to the compound document object 110 by adding, deleting and changing a structuring rule to and from the structuring rule table 121.

For adding a new structuring rule to the structuring rule table 121, with reference to FIG. 4, first, input two objects and a relation name which constitute a structuring rule to be added (Step 401). Responsively, the rule adding, deleting and changing means 123 of the schema object 120 searches the structuring rule table 121 to see if the input structuring rule exists (Step 402) and if it fails to exist, adds the structuring rule in question to the structuring rule table 121 (Step 403). When the structuring rule in question already exists in the structuring rule table 121, end the processing.

Figure 5:
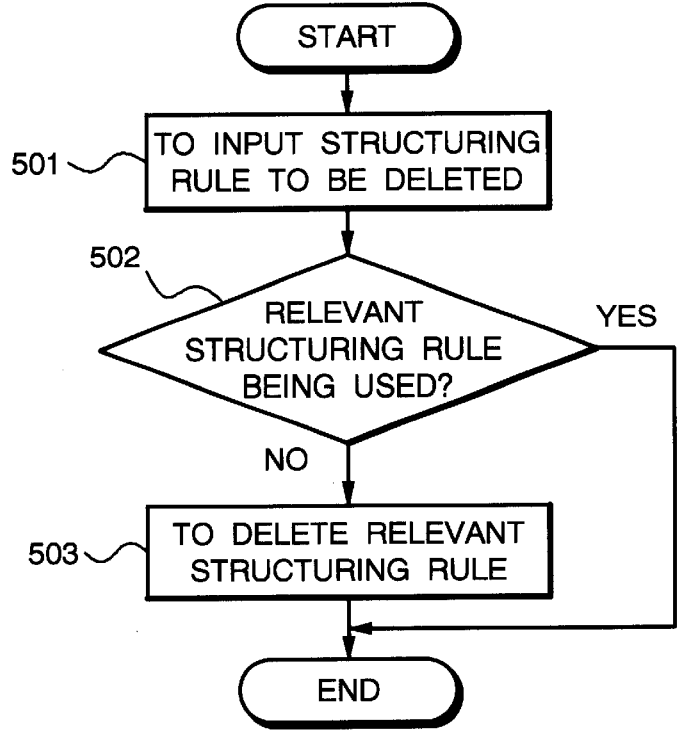
FIG. 5 is a flow chart showing operation of deleting a structuring rule from the structuring rule table in the present embodiment.

For deleting a structuring rule from the structuring rule table 121, with reference to FIG. 5, first, input two objects and a relation name which constitute a structuring rule to be deleted (Step 501). Responsively, the rule adding, deleting and changing means 123 of the schema object 120 sees if the input structuring rule is used in the compound document object in question. More specifically, the compound document being opened is created using the structuring rule in question or not (Step 502). Then, if the structuring rule in question is not being used, delete the rule from the structuring rule table 121 (Step 503) and when it is being used, not delete it.

Whether a structuring rule is being used in a compound document object or not can be recognized, for example, by entering, into a field of the number of references provided in the structuring rule table 121, the number of times the structuring rule is used. The number of references in question will be increased by one every time the structuring rule is used (relating according to the structuring rule in question is conducted) and is decreased by one every time relating of a data object using the structuring rule in question is deleted. Therefore, when the number of references of the designated structuring rule is not 0, the structuring rule in question will not be deleted. When the designated structuring rule fails to exist in the structuring rule table 121, deletion will not be made.

Figure 9:
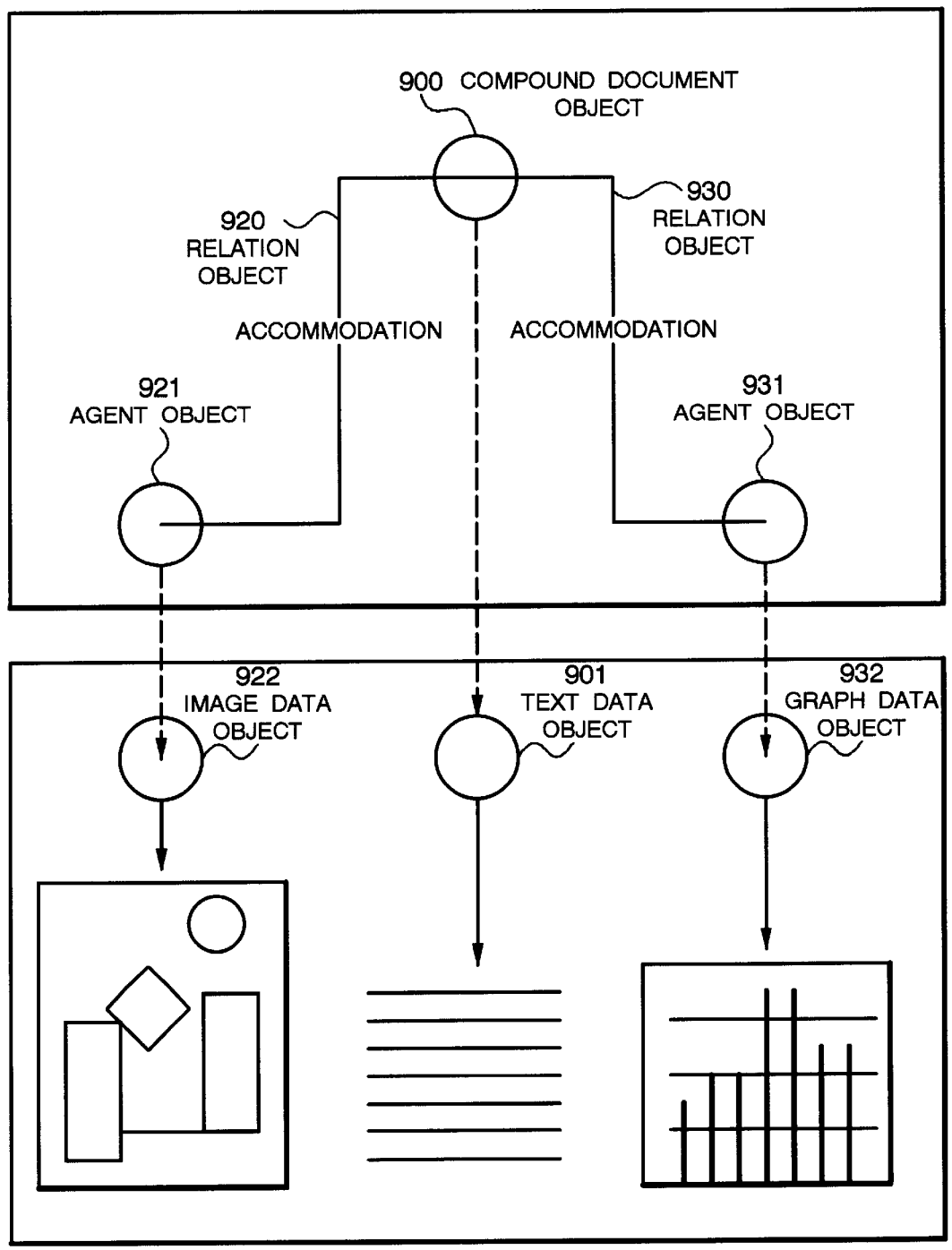
FIG. 9 is a schematic diagram showing a structure of a compound document object using an agent object with respect to the compound document illustrated in FIG. 11.

In the present embodiment, in stead of directly relating a compound document object and a data object as described above, it is possible to constitute a data object by a combination of an agent object and an entity object and relate an agent object to a compound document object as illustrated in FIG. 9. An agent object is an object provided with an interface for every operation for a data object and created to operate only when holding a pointer to an entity object. In this case, a data object in question can be displayed by calling, from an agent object, the corresponding entity object.

Relating an agent object to a compound document object and managing an entity object separately from the compound document object enables improvement of a speed of response to an access from an application program which handles the compound document object, as well as enabling reduction of a size of a storage region required for holding information necessary for reproducing a structure of relations between data objects.

More specifically, at the time of reading a compound document thus managed, not all the data contained in the compound document is read but only a relation between data objects and actual data of a data object which should be presented to a user through a display or the like at the time of starting are read. As a result, in an application program for reading a compound document in which data is already written, user's request can be quickly accepted by loading only an agent object from a file.

In addition, since separate management of a compound document object and actual data (entity object) eliminates the need of actual data for the management of a structure of relations between objects in the compound document object, it is unnecessary for the compound document object holding unit 100 (see FIG. 1) to have a storage capacity enough for storing actual data.

As described above, in a case where to a compound document object, only an agent object is to be related, an entity object (actual data) does not need to be stored in the same data file or storage device as that of the compound document object. In other words, it is possible to store a compound document object and an entity object in a plurality of terminal devices and storage devices connected over a network to as required call, from an agent object related to the compound document object, the corresponding entity object.

Thus, when one compound document is handled by a plurality of users under distributed surroundings, an agent object is provided with a lock/unlock interface, while the compound document object applies an access control list to the agent object. In addition, operation to the compound document is conducted through the agent object.

Then, when a predetermined user accesses actual data of a data object through the agent object, for the reading only, the lock/unlock interface of the agent object is unlocked and for the writing, the interface in question is locked to conduct exclusive control necessary for writing.

In addition, by sequencing every operation of each user regarding a compound document through a server, relations of agent objects contained in a compound document held for each client program and consistency of a lock state of an individual agent object are ensured.

Next, with reference to an example of a specific structure of a compound document object, embodiment of the present invention will be described.

FIG. 6 is a schematic diagram showing a structure of a compound document object when the compound document illustrated in FIG. 11 is managed by the compound document management system of the present embodiment. With reference to FIG. 6, to a compound document object 600, an image data object 611 is related by an "accommodation" relation object 610 and a graph data object 621 is related by an "accommodation" relation object 620. It is assumed that as a text data object, the compound document object 600 also serves.

Next, description will be made of operation of relating the image data object 611 to the compound document object 600 in accommodated-accommodating relations as illustrated in FIGS. 6 and 11. To relate image data stored in a clip-board to the compound document object 600, first, in response to the user's application of an instruction to paste the image data in question, the compound document object 600 inquires of a schema object whether relating is possible with three arguments "document", "image" and "accommodation". The schema object searches for a relevant structuring rule and returns a search result.

When the schema object has the structuring rule table shown in FIG. 2, the schema object returns a reply indicating that the relevant structuring rule exists to the compound document object 600. The compound document object 600 accordingly generates the "accommodation" relation object 610, and sets the compound document object 600 at a source pointer of the relation object 610 and sets the image object 611 at a destination pointer.

Display of the data objects 611 and 621 related to the compound document object 600 is executed by an instruction of the relation object contained in the corresponding structuring rule registered in the structuring rule table of the schema object. The "accommodation" relation object contained in the structuring rule in question has a definition of signification of relating between objects represented by "accommodation", that is, a method of displaying an accommodated object within a display region of an accommodation destination object as described above.

In the present embodiment, since the compound document object serves also as a text data object, at the time of displaying a text data object, an "accommodation" relation object is also to be displayed.

The compound document object therefore inquires of the "accommodation" relation object of the relevant structuring rule registered in the structuring rule table of the schema object about a display size. The "accommodation" relation object returns the display size of the accommodated object to the compound document object, and the compound document object secures a region of the received display size for the "accommodation" relation object.

Subsequently, the "accommodation" relation object calls a drawing method, using the display region secured by the compound document object for the accommodated object as an argument. Then, the accommodated object draws data (image and graph) at the display region. As a result, within the display region managed by the compound document object, a compound document in which the accommodated object exists is displayed.

Figure 7:
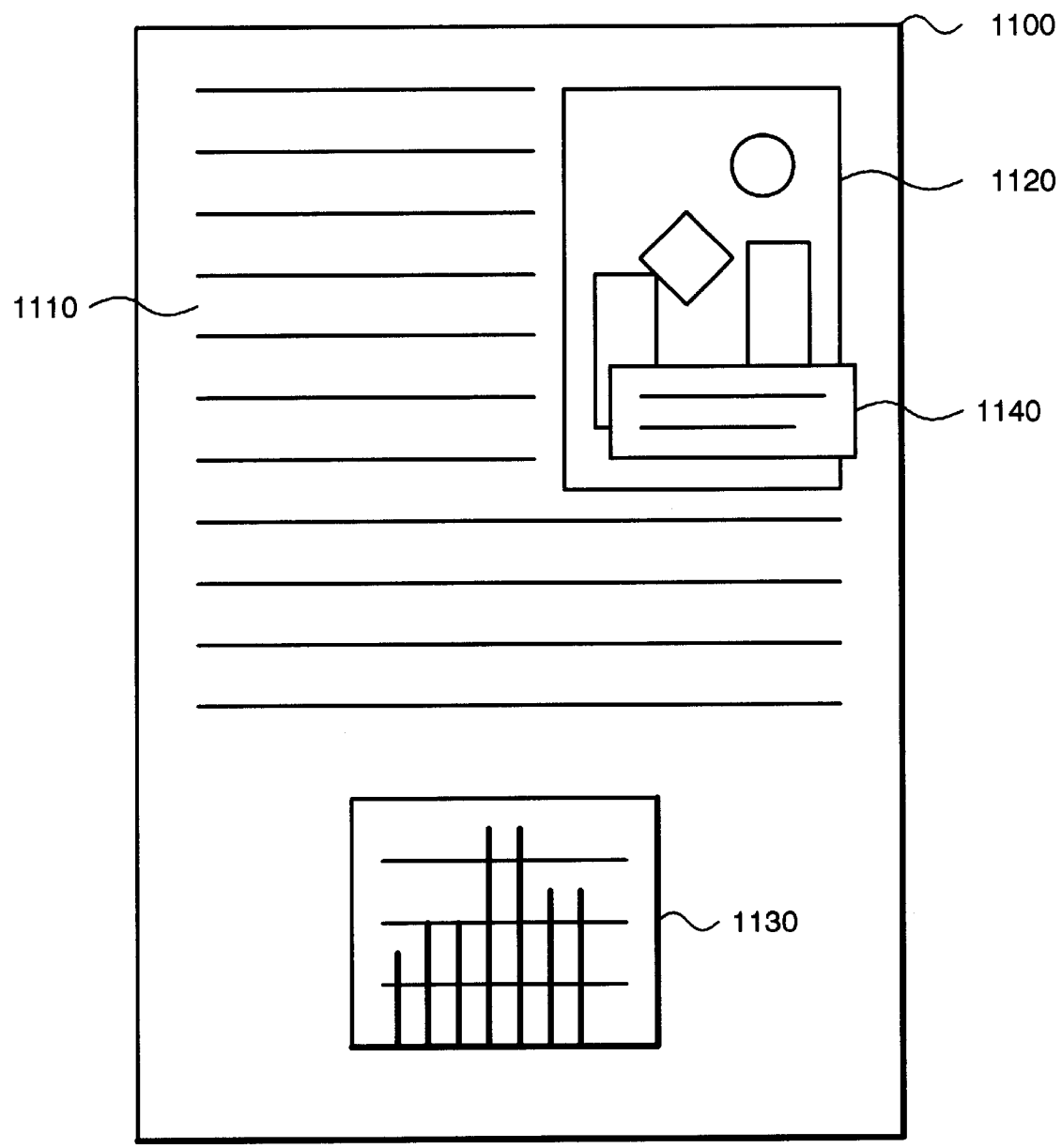
FIG. 7 is a diagram showing an example of a structure of a compound document.
Figure 8:
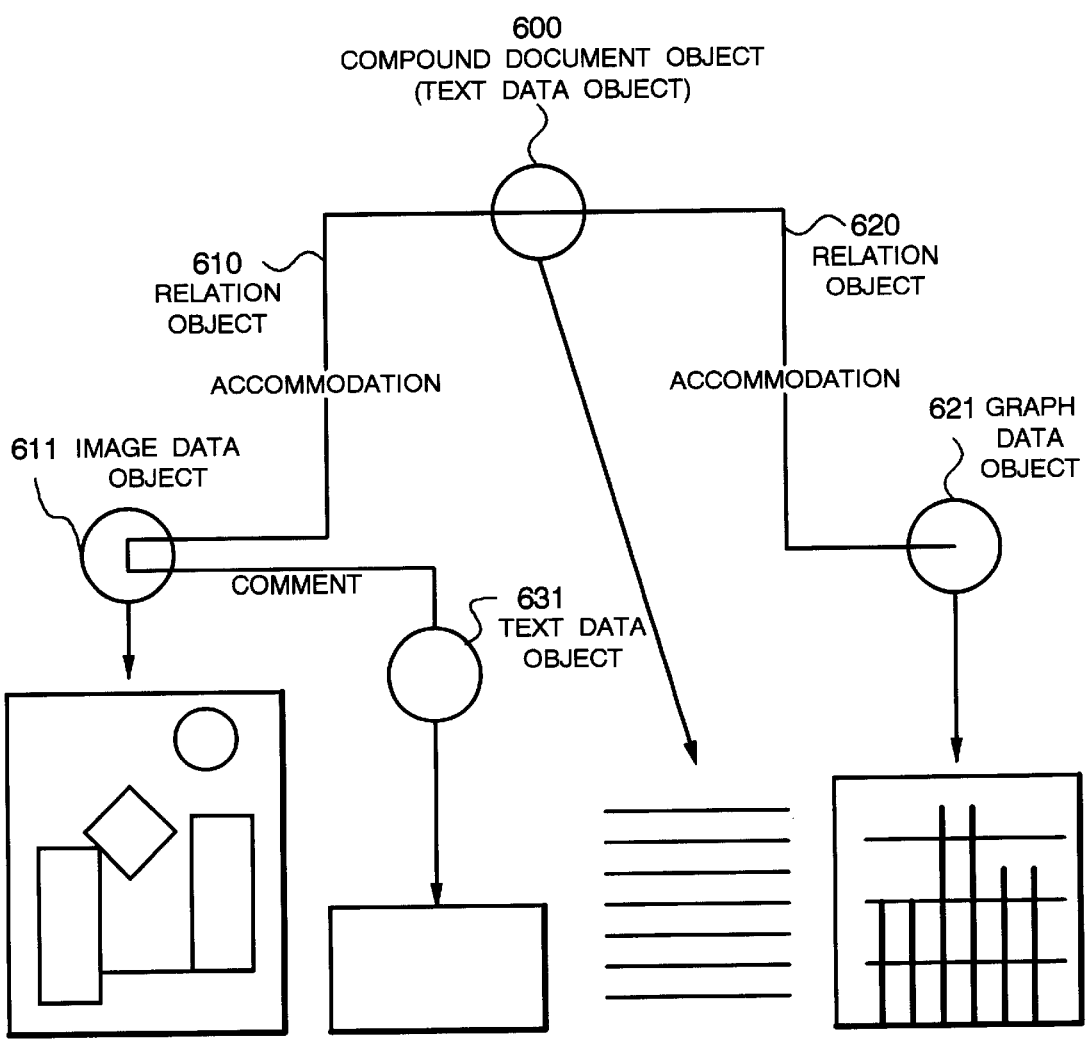
FIG. 8 is a schematic diagram showing a structure of a compound document object with respect to the compound document illustrated in FIG. 7.

Next, description will be made of the embodiment in a case where, as illustrated in FIG. 7, comments 1140 are displayed in the image 1120 of the compound document 1100 shown in FIG. 11. FIG. 8 is a schematic diagram showing a structure of a compound document object when the compound document illustrated in FIG. 7 is managed by the compound document management system of the present embodiment. With reference to FIG. 8, to the compound document object 600, the image data object 611 is related by the "accommodation" relation object 610, and the graph data object 621 is related by the "accommodation" relation object 620 similarly to the case of FIG. 6. Furthermore, to the image data object 611, a text data object 631 is related by a "comment" relation object 630.

The "comment" relation object 630, when a cursor of the pointing device is located in a display region of the image 1120 in the compound document 1100 shown in FIG. 7, displays the text of the comments 1140 at a predetermined position, for example, at a position of the cursor in question or a designated position within the display region of the image 1120. When in the structuring rule table of the schema object, a structuring rule containing a "comment" relation object is registered, relating of a data object by the "comment" relation object in question is possible. On the other hand, when such a structuring rule is not registered in the structuring rule table, the structuring rule in question should be additionally registered in the structuring rule table using the rule adding, deleting and changing means of the schema object.

Description will be next made of operation of relating the text data object 631 of the comments to the image data object 611 as illustrated in FIGS. 7 and 8. First, through the operation of the application program (client program), designate the image 1120 in the compound document 1100 of FIG. 11 to obtain the image data object 611 which is to be a source object. Next, upon selection of a text tool through the user interface, the compound document object 600 inquires of the schema object about a structuring rule which has "image" as a source object and "text" as a destination object.

When in the structuring rule table 121, a structuring rule is registered which has "image" as a source object, "text" as a destination object and "accommodation" and "comment" as relation objects as shown in FIG. 2, the inquired schema object detects the relevant structuring rule and displays a dialog for making a user select one of the two relation objects.

When the user selects "comment" as a relation object, the compound document object 600 generates the text data object 631 and generates the "comment" relation object 630 which relates the image data object 611 and the text object 631. Then, the object 600 sets the image object 611 to the source pointer of the relation object 630 and sets the text object 631 to the destination pointer. As a result, formed is such a tree structure as illustrated in FIG. 6 with the compound document object as a root, other data objects as nodes and relation objects as edges.

Display of the text data object 631 related to the image data object 611 is executed by an instruction of a relation object contained in the corresponding structuring rule registered in the structuring rule table of the schema object. A "comment" relation object contained in the relevant structuring rule, as mentioned above, has a definition of signification of relating between objects represented as "comment", that is, a method of displaying the text data object 631 as comments.

In the present embodiment, when upon operation of the pointing device by the user, the cursor enters the display region of the image 1120 in the compound document 1100 of FIG. 7, the application program obtains an event (hereinafter, referred to as a move event) indicating that the cursor of the pointing device is located at a position corresponding to the display region of the image 1120 from the operating system. Then, application program asks the compound document object 600 to process the move event in question.

The compound document object 600 scans relations among the held data objects 611, 621 and 631 to obtain a pointer to the image data object 611 and calls the processing for a move event. According to a common method of processing events (including move, click and double-click) in a data object, call the processing of an event in question for a relation object related to the own data object. The image data object 610 therefore calls a method of processing a move event for the "comment" relation object 630.

Since the "comment" relation object 630 in question holds the pointer of the image data object 611 as a source pointer and the pointer of the text data object 631 as a destination pointer, a possible method of processing a move event for the "comment" relation object 630 in question is to obtain a display region of the image data object 611 and display the text data object 631 at an appropriate position on the region. As a result, entering of the cursor of the pointing device into the display region of the image 1120 leads to display of the comments 1140 of the image 1120 in question.

Comments displaying position may be fixedly set on a target to which the comments in question are related (image 1120 in this case) at an appropriate position (e.g. lower right corner of the display region of the image 1120) or may be dynamically set according to conditions such as a kind, a display size and a display position of the target to which the comments in question are related. The comments may be also displayed at a position of the cursor of the pointing device when entering a display region of the target to which the relevant comments are related.

Figure 10:
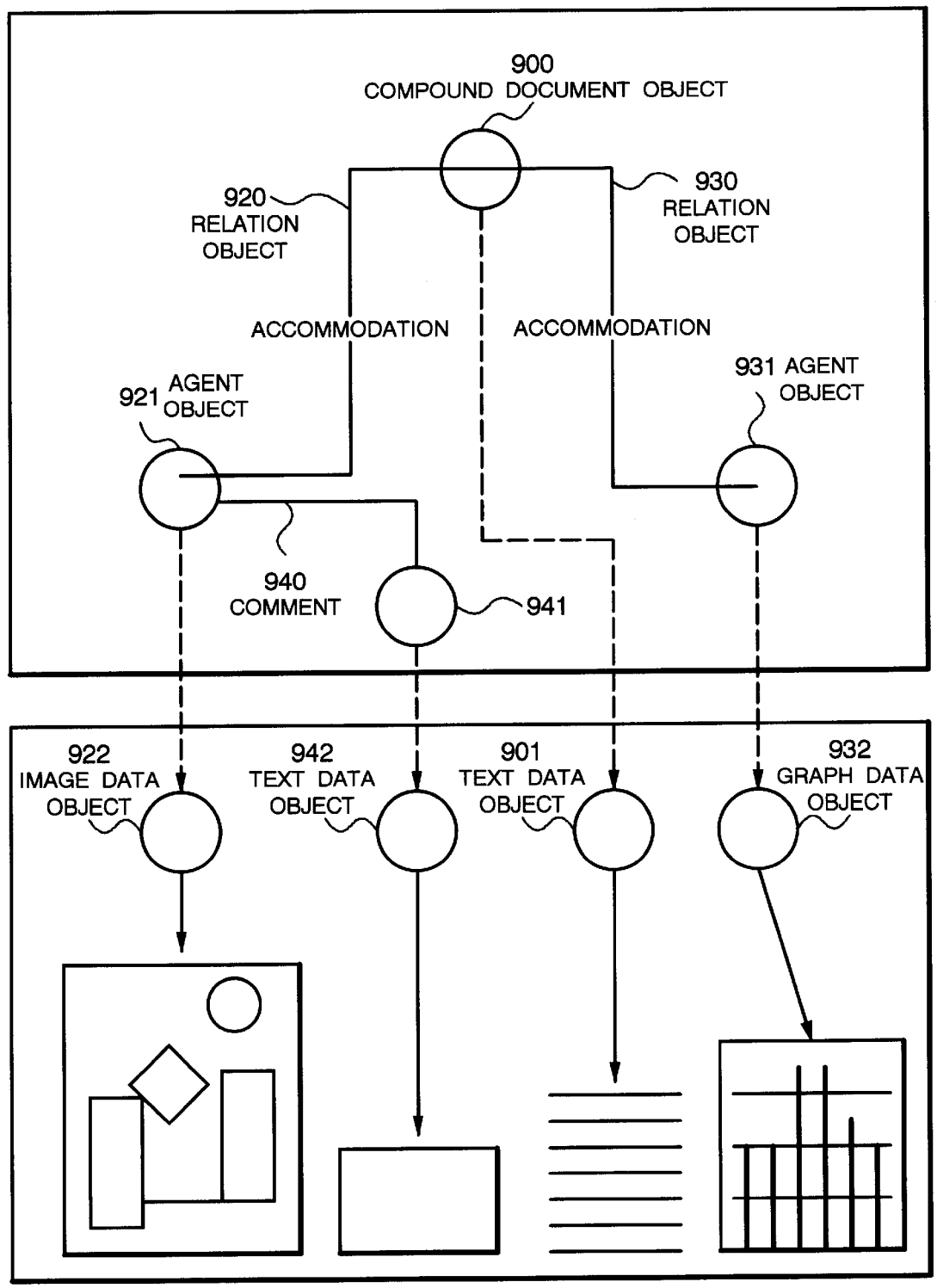
FIG. 10 is a schematic diagram showing a structure of a compound document object using an agent object with respect to the compound document illustrated in FIG. 7.

Description will be next made of the embodiment in a case where a structure of relations between objects in a compound document object is managed by using an agent object. FIG. 9 is a schematic diagram showing a structure of a compound document object in a case where the compound document illustrated in FIG. 11 is managed by the compound document management system of the present embodiment using an agent object. FIG. 10 is a schematic diagram showing a structure of a compound document object in a case where the compound document with comments shown in FIG. 7 is similarly managed.

With reference to FIG. 9, to a compound document object 900, an agent object 921 corresponding to an image data object 922 is related by an "accommodation" relation object 920, and an agent object 931 corresponding to a graph data object 932 is related by an "accommodation" relation object. The compound document object 900 also serves as an agent object corresponding to a text data object 901.

In addition to the above-described structure of relations, with reference to FIG. 10, to the agent object 921 corresponding to the image data object 922, an agent object 941 corresponding to a text data object 942 is related by a "comment" relation object 940.

The operation is the same as that of the embodiment shown in FIGS. 6 and 7 with the only difference being that the operation of relating the data objects 922 and 932 to the compound document object 900 in accommodated-accommodating relations and the operation of relating the text data object 942 of the comments to the image data object 922 are all conducted through the agent objects 921, 931 and 941.

As described above, at the time of reading a compound document by using an agent object, not all the data contained in the compound document is read but a relation between data objects made up of a relation object and an agent object and actual data of a data object which needs to be presented to a user through a display or the like at the time of starting (e.g. text data object 901, image data object 922 and graph data object 932) are read.

Although the present invention has been described with respect to the preferred embodiment in the foregoing, the present invention is not limited to the above-described embodiment.

As described in the foregoing, according to the compound document management system, the compound document structure managing method and the recording medium which stores a compound document structure management program of the present invention, managing a structuring rule which sets a structure of relations between objects by using a schema object enables generation of a plurality of compound documents having different structures using the same application program.

In addition, by newly adding a structuring rule, objects can be related to each other to have a new relational structure, which enables a structure of a compound document to be set more flexibly.

Furthermore, with a data object divided into an agent object and an entity object, managing a structure of a compound document by using an agent object, as well as managing an entity object independently of a compound document object, enables access control on an object basis, which leads to an increase in a speed of response to an access from an application program which handles a compound document object, as well as to a reduction of the size of a storage region required for holding information necessary for reproducing a structure of relations between data objects.

Moreover, for handling a compound document under these distributed surroundings, providing an agent object with a lock/unlock interface, as well as applying an access control list to an agent object by a compound document object ensures consistency of the document contents.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A compound document management system for managing a structure of a compound document in which data of different formats such as text and image is embedded, comprising:

compound document object holding means for holding a compound document object which accommodates various kinds of data objects; and schema object generating means for generating a schema object which manages a structure of relations between data objects accommodated in a compound document object and applying the schema object to the compound document object in question, wherein said schema object, when said compound document object newly relates to other data objects, only if relating of said other data objects in a desired manner is possible, relates the other data objects in question, and wherein said schema object generating means generates a schema file and a relation object, the schema file and relation object comprising a list of structuring rules for initialization of the schema object, and wherein said schema object comprises:

a structuring rule table in which said structuring rules defining a relation between data objects are accumulated, said structuring rules expressing a combination of a first object that is the target of relating, a second object to be related, and a relation object relating said first and second objects, and wherein initialization of the schema object includes writing into the structuring rule table a list of structuring rules composed of names of two data objects applied as a schema file and a relation object.

2. The compound document management system as set forth in claim 1, wherein said schema object comprises:

rule searching means for checking a possibility/impossibility of relating of a data object with reference to said structuring rule table, and said compound document object, when newly relating to other data objects, inquires of said rule searching means whether relating of the other data objects in a desired manner is possible or not.

3. The compound document management system as set forth in claim 1, wherein said data object is composed of an entity object made up of actual data and an agent object corresponding to the entity object in question, said entity object is managed independently of said compound document object, and said compound document object conducts relating of the entity object by the management of a structure of a relation of said agent object.

4. The compound document management system as set forth in claim 1, wherein
said schema object comprises:
rule searching means for checking a possibility/impossibility of relating of a data object with reference to said structuring rule table,
said compound document object, when newly relating to other data objects, inquires of said rule searching means whether relating of the objects in a desired manner is possible or not,
said data object is composed of an entity object made up of actual data and an agent object corresponding to the entity object in question,
said entity object is managed independently of said compound document object, and
said compound document object conducts relating of the entity object by the management of a structure of a relation of said agent object.

5. The compound document management system as set forth in claim 1, wherein
said data object is composed of an entity object made up of actual data and an agent object corresponding to the entity object in question,
said entity object is managed independently of said compound document object,
said compound document object conducts relating of the entity object by the management of a structure of a relation of said agent object,
said agent object has a lock/unlock interface, and
said compound document object applies an access control list to said agent object.

6. The compound document management system as set forth in claim 1, further comprising
rule adding, deleting and changing means for executing addition, deletion and change of a structuring rule with respect to said structuring rule table, wherein the contents of said structuring rule table are changed as required.

7. The compound document management system as set forth in claim 1, wherein
said data object is composed of an entity object made up of actual data and an agent object corresponding to the entity object in question,
said entity object is managed independently of said compound document object, and
said compound document object conducts relating of the entity object by the management of a structure of a relation of said agent object, and which further comprises
rule adding, deleting and changing means for executing addition, deletion and change of a structuring rule with respect to said structuring rule table, wherein the contents of said structuring rule table are changed as required.

8. The compound document management system as set forth in claim 1, wherein
said data object is composed of an entity object made up of actual data and an agent object corresponding to the entity object in question,
said entity object is managed independently of said compound document object,
said compound document object conducts relating of the entity object by the management of a structure of a relation of said agent object,
said agent object has a lock/unlock interface, and
said compound document object applies an access control list to said agent object, and which further comprises
rule adding, deleting and changing means for executing addition, deletion and change of a structuring rule with respect to said structuring rule table, wherein the contents of said structuring rule table are changed as required.

9. A compound document structure managing method of managing a structure of a compound document in which data of different formats such as text and image is embedded, comprising the steps of:
generating a schema object including a structuring rule table in which structuring rules defining a possible structure of relations between objects are accumulated,
checking, using rule search means, a possibility/impossibility of relating a data object with reference to said structuring rule table and a schema file and a relation object, the schema file and relation object comprising a list of structuring rules, for initialization of the schema object, and applying the schema object to a compound document object accommodating various kinds of data objects held in compound document object holding means, and
when newly relating a data object to said compound document object, inquiring of said rule searching means whether relating of data objects in a desired manner is possible or not and, only when the relating is possible, relating the data objects in question, and
wherein said schema object comprises:
a structuring rule table in which said structuring rules defining a relation between data objects are accumulated, said structuring rules expressing a combination of a first object that is the target of relating, a second object to be related, and a relation object relating said first and second objects, and
wherein initialization of the schema object includes writing into the structuring rule table a list of structuring rules composed of names of two data objects applied as a schema file and a relation object.

10. The compound document structure managing method as set forth in claim 9, wherein
at said step of newly relating a data object to said compound document object,
said data object is composed of an entity object made up of actual data and an agent object corresponding to the entity object in question,
said entity object is managed independently of said compound document object, and
said compound document object conducts relating of the entity object by the management of a structure of a relation of said agent object.

11. The compound document structure managing method as set forth in claim 9, wherein
said schema object generated at said schema object generating step further comprises rule adding, deleting and changing means for executing addition, deletion and change of a structuring rule with respect to said structuring rule table, and which further comprises
the step of changing the contents of said structuring rule table by using said rule adding, deleting and changing means as required.

12. The compound document structure managing method as set forth in claim 9, wherein
at said step of newly relating a data object to said compound document object, said data object is composed of an entity object made up of actual data and an agent object corresponding to the entity object in question, said entity object is managed independently of said compound document object, and said compound document object conducts relating of the entity object by the management of a structure of a relation of said agent object, and said schema object generated at said schema object generating step further comprises rule adding, deleting and changing means for executing addition, deletion and change of a structuring rule with respect to said structuring rule table, and which further comprises the step of changing the contents of said structuring rule table by using said rule adding, deleting and changing means as required.

13. A computer readable memory storing a compound document structure management program for controlling a compound document management system which manages a structure of a compound document in which data of different formats such as text and image is embedded, said compound document structure management program comprising the steps of:

generating a schema object including a structuring rule table in which structuring rules defining a possible structure of relations between objects are accumulated, checking, using rule search means, a possibility/impossibility of relating a data object with reference to said structuring rule table and a schema file and a relation object, the schema file and relation object comprising a list of structuring rules, for initialization of the schema object, and applying the schema object to a compound document object accommodating various kinds of data objects held in compound document object holding means, and when newly relating a data object to said compound document object, inquiring of said rule searching means whether relating of data objects in a desired manner is possible or not and, only when the relating is possible, relating the data objects in question, and wherein said schema object comprises:

a structuring rule table in which said structuring rules defining a relation between data objects are accumulated, said structuring rules expressing a combination of a first object that is the target of relating, a second object to be related, and a relation object relating said first and second objects, and wherein initialization of the schema object includes writing into the structuring rule table a list of structuring rules composed of names of two data objects applied as a schema file and a relation object.

14. The computer readable memory storing a compound document structure management program as set forth in claim 13, wherein in the compound document structure management program, at said step of newly relating a data object to said compound document object, said data object is composed of an entity object made up of actual data and an agent object corresponding to the entity object in question, said entity object is managed independently of said compound document object, and said compound document object conducts relating of the entity object by the management of a structure of a relation of said agent object.

15. The computer readable memory storing a compound document structure management program as set forth in claim 13, wherein in said compound document structure management program, said schema object generated at said schema object generating step further comprises rule adding, deleting and changing means for executing addition, deletion and change of a structuring rule with respect to said structuring rule table, and wherein said compound document structure management program further comprises the step of changing the contents of said structuring rule table by using said rule adding, deleting and changing means as required.

16. The computer readable memory storing a compound document structure management program as set forth in claim 13, wherein in said compound document structure management program, at said step of newly relating a data object to said compound document object, said data object is composed of an entity object made up of actual data and an agent object corresponding to the entity object in question, said entity object is managed independently of said compound document object, and said compound document object conducts relating of the entity object by the management of a structure of a relation of said agent object, and said schema object generated at said schema object generating step further comprises rule adding, deleting and changing means for executing addition, deletion and change of a structuring rule with respect to said structuring rule table, and wherein said compound document structure management program further comprises the step of changing the contents of said structuring rule table by using said rule adding, deleting and changing means as required.

17. A compound document management system for managing a structure of a compound document in which data of different formats such as text and image is embedded, comprising:

a compound document object holding unit for holding a compound document object which accommodates various kinds of data objects, and a schema object generating unit for generating a schema object which manages a structure of relations between data objects accommodated in a compound document object and applying the schema object to the compound document object in question, wherein said schema object comprises:

a structuring rule table in which structuring rules defining a possible structure of relations between objects are accumulated, said structuring rules expressing a combination of a first object that is the target of relating, a second object to be related, and a relation object relating said first and second objects, and a rule searching unit for checking a possibility/impossibility of relating of a data object with reference to said structuring rule table, and said compound document object, when newly relating to other data objects, inquires of said rule searching unit whether relating of the data objects in a desired manner is possible or not and, only when the relating is possible, said schema object relates the data objects in question, wherein said schema object generating unit generates a schema file and a relation object, the schema file and relation object comprising a list of structuring rules, for initialization of the schema object, and wherein initialization of the schema object includes writing into the structuring rule table a list of structuring rules composed of names of two data objects applied as a schema file and a relation object.

18. The compound document management system as set forth in claim 17, wherein said data object is composed of an entity object made up of actual data and an agent object corresponding to the entity object in question, said entity object is managed independently of said compound document object, and said compound document object conducts relating of the entity object by the management of a structure of a relation of said agent object.

19. The compound document management system as set forth in claim 17, wherein said agent object has a lock/unlock interface, and said compound document object applies an access control list to said agent object.

20. The compound document management system as set forth in claim 17, further comprising rule adding, deleting and changing means for executing addition, deletion and change of a structuring rule with respect to said structuring rule table, wherein the contents of said structuring rule table are changed as required.

* * * * *